US006329943B1

(12) United States Patent
Pasawicz

(10) Patent No.: US 6,329,943 B1
(45) Date of Patent: Dec. 11, 2001

(54) ILLUMINATED REMOTE CONTROL SYSTEM

(76) Inventor: Scott B. Pasawicz, 58 Ashford Dr., Plainsboro, NJ (US) 08536

(*) Notice: Subject to any disclaimer, the term of this patent is extended or adjusted under 35 U.S.C. 154(b) by 0 days.

(21) Appl. No.: 09/276,097

(22) Filed: Mar. 25, 1999

(51) Int. Cl.[7] .......................... G08C 19/12; H04L 17/02

(52) U.S. Cl. ...................... 341/176; 340/815.6; 359/142

(58) Field of Search .......................... 341/176; 345/169; 359/142; 340/815.6

(56) References Cited

U.S. PATENT DOCUMENTS 4,949,230 * 8/1990 Burmeister ........................ 362/109
5,899,553 * 5/1999 Howell ................................ 362/84

* cited by examiner

*Primary Examiner*—Michael Horabik
*Assistant Examiner*—Timothy Edwards, Jr.

(57) ABSTRACT

A new Illuminated Remote Control System for illuminating reading material while allowing control over a remote control or for illuminating a darkened room. The inventive device includes a standard remote control with illuminated control buttons, a lighting device rotatably secured to a bottom surface of the standard remote control which illuminates the reading material, and a clip secured to the lighting device thereby capturing reading material for supporting the present invention with respect to the reading material.

19 Claims, 3 Drawing Sheets

ILLUMINATED REMOTE CONTROL SYSTEM

BACKGROUND OF THE INVENTION

1. Field of the Invention

The present invention relates to Remote Control Devices and more particularly pertains to a new Illuminated Remote Control System for illuminating reading material while allowing control over a remote control or for illuminating a darkened room.

2. Description of the Prior Art

The use of Remote Control Devices is known in the prior art. More specifically, Remote Control Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Remote Control Devices include U.S. Pat. No. 4,626,847; U.S. Design Pat. No. 317,310; U.S. Design Pat. No. 344,149; U.S. Design Pat. No. 280,494; U.S. Design Pat. No. 311,067 and U.S. Design Pat. No. 301,037.

While these devices fulfill their respective, particular objectives and requirements, the aforementioned patents do not disclose a new Illuminated Remote Control System. The inventive device includes a standard remote control with illuminated control buttons, a lighting device rotatably secured to a bottom surface of the standard remote control which illuminates the reading material, and a clip secured to the lighting device thereby capturing reading material for supporting the present invention with respect to the reading material.

In these respects, the Illuminated Remote Control System according to the present invention substantially departs from the conventional concepts and designs of the prior art, and in so doing provides an apparatus primarily developed for the purpose of illuminating reading material while allowing control over a remote control or for illuminating a darkened room.

SUMMARY OF THE INVENTION

In view of the foregoing disadvantages inherent in the known types of Remote Control Devices now present in the prior art, the present invention provides a new Illuminated Remote Control System construction wherein the same can be utilized for illuminating reading material while allowing control over a remote control or for illuminating a darkened room.

The general purpose of the present invention, which will be described subsequently in greater detail, is to provide a new Illuminated Remote Control System apparatus and method which has many of the advantages of the Remote Control Devices mentioned heretofore and many novel features that result in a new Illuminated Remote Control System which is not anticipated, rendered obvious, suggested, or even implied by any of the prior art Remote Control Devices, either alone or in any combination thereof To attain this, the present invention generally comprises a standard remote control with illuminated control buttons, a lighting device rotatably secured to a bottom surface of the standard remote control which illuminates the reading material, and a clip secured to the lighting device thereby capturing reading material for supporting the present invention with respect to the reading material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Illuminated Remote Control System apparatus and method which has many of the advantages of the Remote Control Devices mentioned heretofore and many novel features that result in a new Illuminated Remote Control System which is not anticipated, rendered obvious, suggested, or even implied by any of the prior art Remote Control Devices, either alone or in any combination thereof It is another object of the present invention to provide a new Illuminated Remote Control System which may be easily and efficiently manufactured and marketed.

It is a further object of the present invention to provide a new Illuminated Remote Control System which is of a durable and reliable construction.

An even further object of the present invention is to provide a new Illuminated Remote Control System which is susceptible of a low cost of manufacture with regard to both materials and labor, and which accordingly is then susceptible of low prices of sale to the consuming public, thereby making such Illuminated Remote Control System economically available to the buying public.

Still yet another object of the present invention is to provide a new Illuminated Remote Control System which provides in the apparatuses and methods of the prior art some of the advantages thereof, while simultaneously overcoming some of the disadvantages normally associated therewith.

Still another object of the present invention is to provide a new Illuminated Remote Control System for illuminating reading material while allowing control over a remote control or for illuminating a darkened room.

Yet another object of the present invention is to provide a new Illuminated Remote Control System which includes a standard remote control with illuminated control buttons, a lighting device rotatably secured to a bottom surface of the standard remote control which illuminates the reading material, and a clip secured to the lighting device thereby capturing reading material for supporting the present invention with respect to the reading material.

Still yet another object of the present invention is to provide a new Illuminated Remote Control System that holds the reading material while the light simultaneously illuminates the pages of the reading material.

Even still another object of the present invention is to provide a new Illuminated Remote Control System that allows the user the ability to see within a darkened room.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

DESCRIPTION OF THE PREFERRED EMBODIMENT

Figure 1:
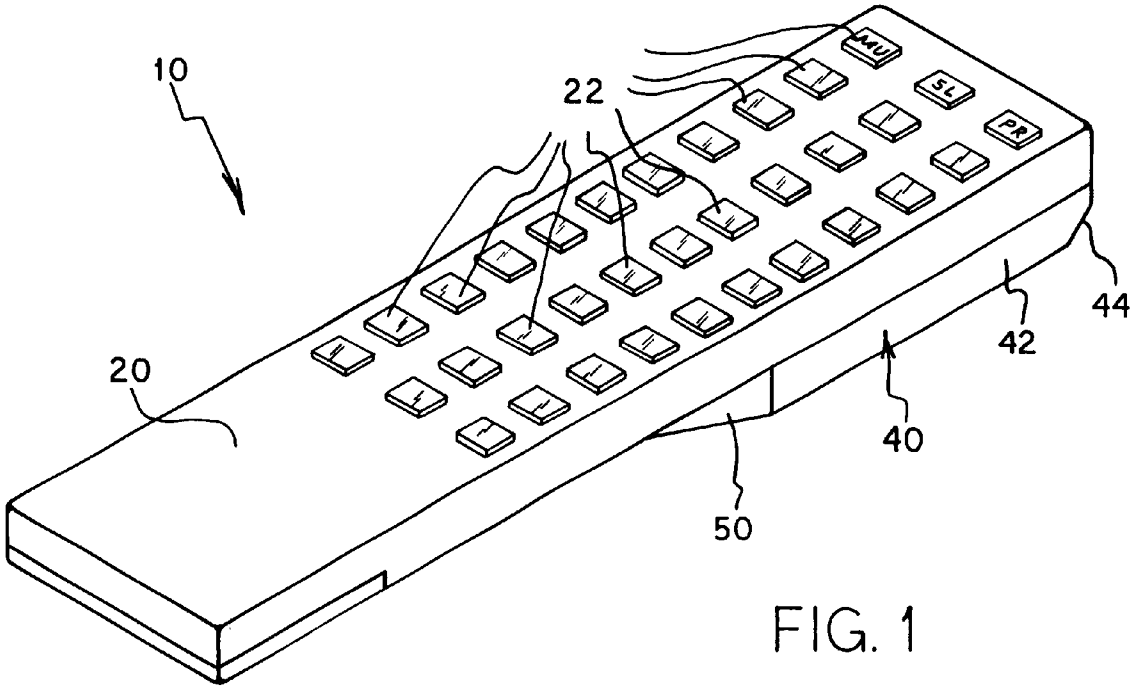
FIG. 1 is an upper side perspective view of a new Illuminated Remote Control System according to the present invention.

With reference now to the drawings, and in particular to FIGS. 1 through 7 thereof, a new Illuminated Remote Control System embodying the principles and concepts of the present invention and generally designated by the reference numeral 10 will be described.

Figure 6:
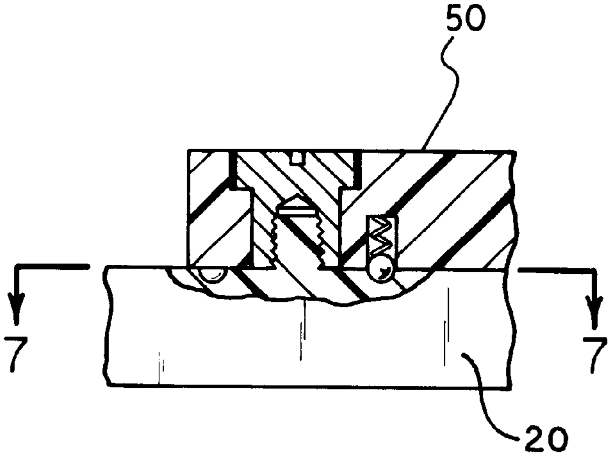
FIG. 6 is a cross sectional view taken along line 6—6 of FIG. 4 disclosing the detent hinge.
Figure 7:
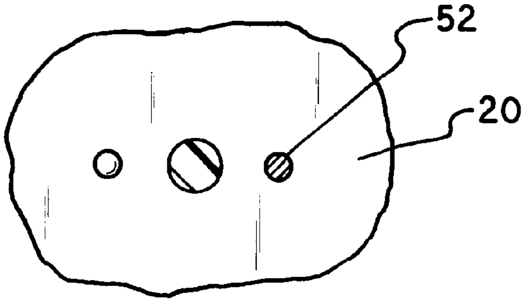
FIG. 7 is a cross sectional view taken along line 7—7 of FIG. 6.

More specifically, it will be noted that the Illuminated Remote Control System 10 comprises a standard remote control 20 including a plurality of illuminated control buttons 22, and an illuminating means 40 rotatably secured to a bottom surface of the standard remote control 20 by a detent hinge 50, wherein the illuminating means 40 is formed to the shape of the standard remote control 20. As shown in FIGS. 6 and 7 of the drawings, the detent hinge 50 includes a plurality of ball bearings 52 for allowing selective positions for the illuminating means to be achieved.

Figure 2:
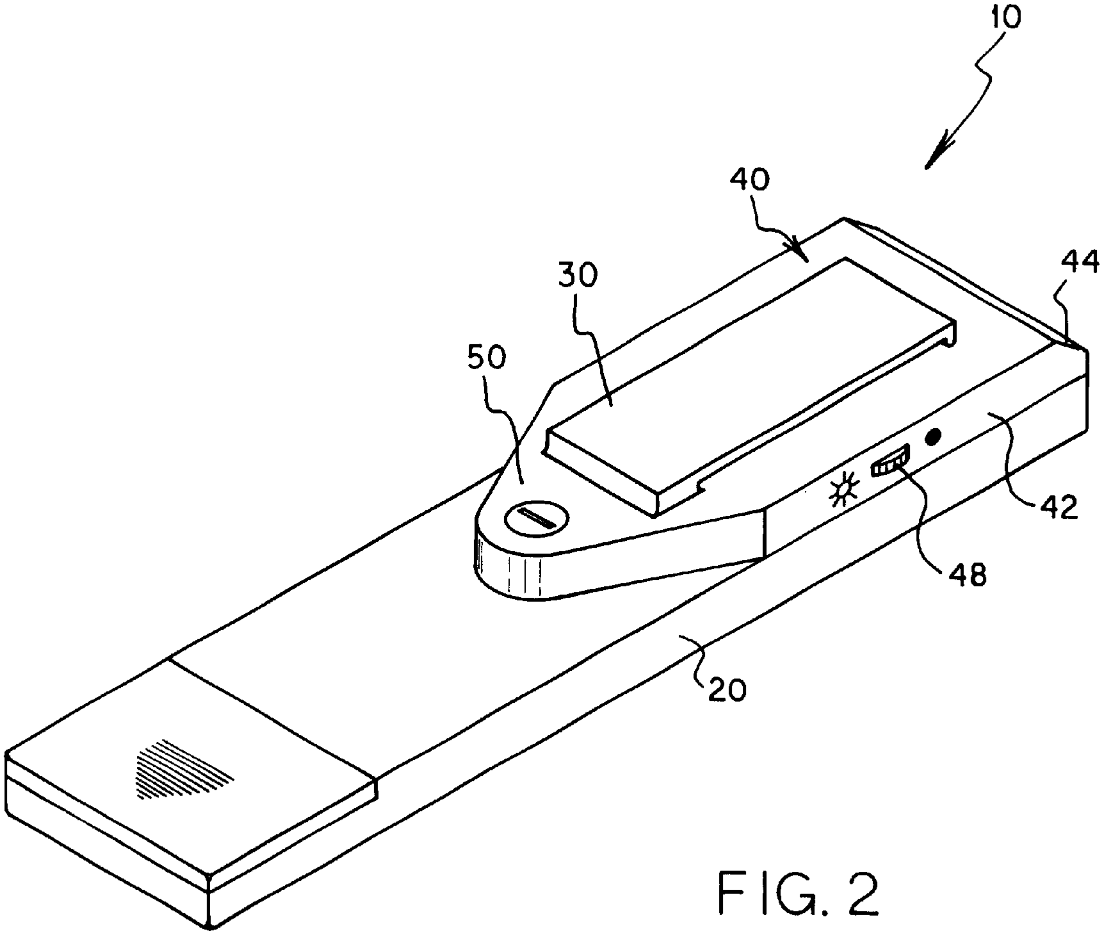
FIG. 2 is an upper perspective view of the present invention's bottom portion displaying the clip and the illuminating means.
Figure 3:
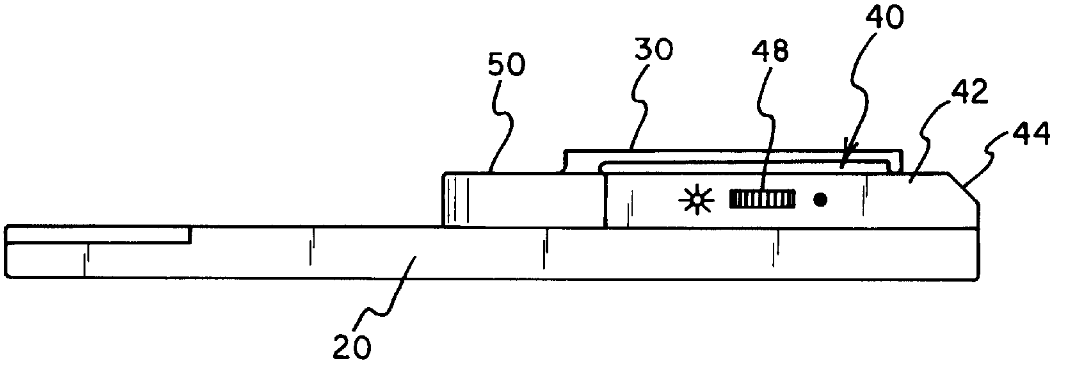
FIG. 3 is a side view of the present invention with the illuminating means in the storage position.
Figure 4:
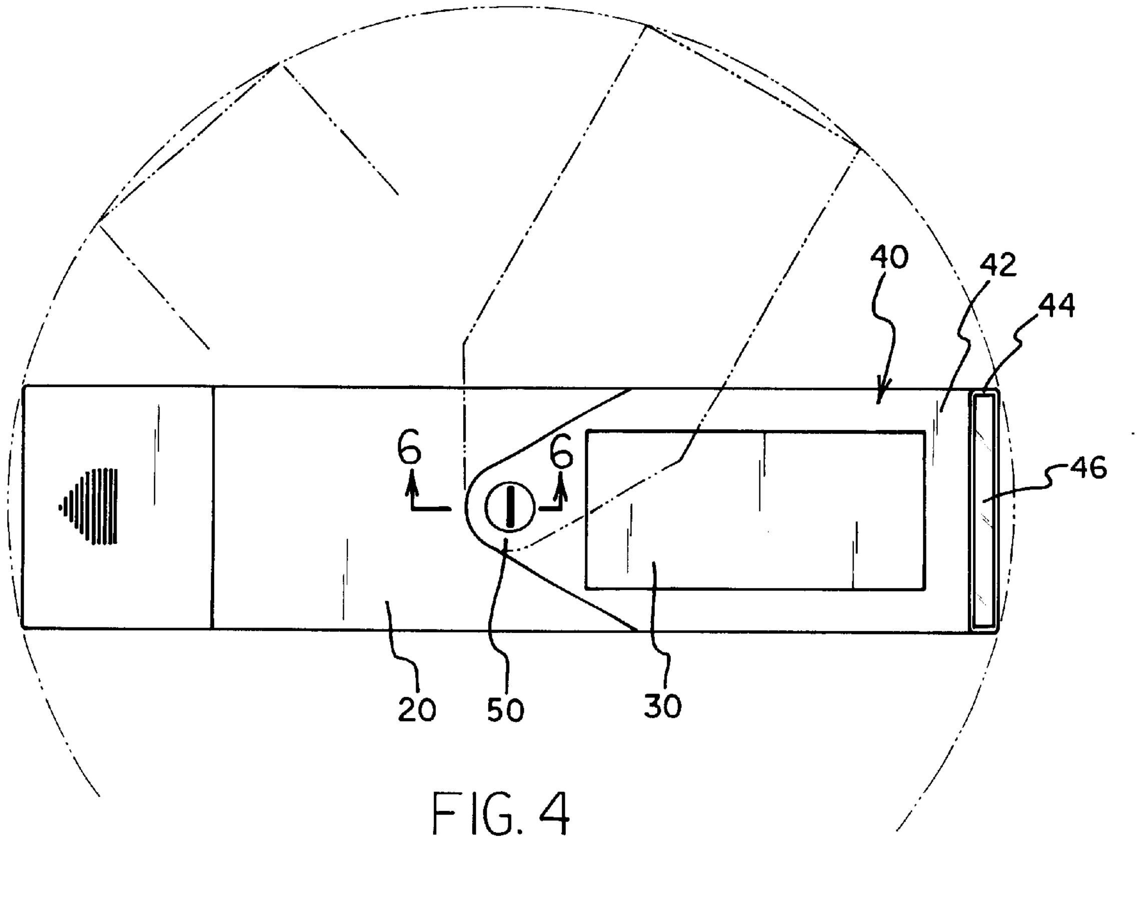
FIG. 4 is a side view of the present invention with the illuminating means in the various illuminating positions.
Figure 5:
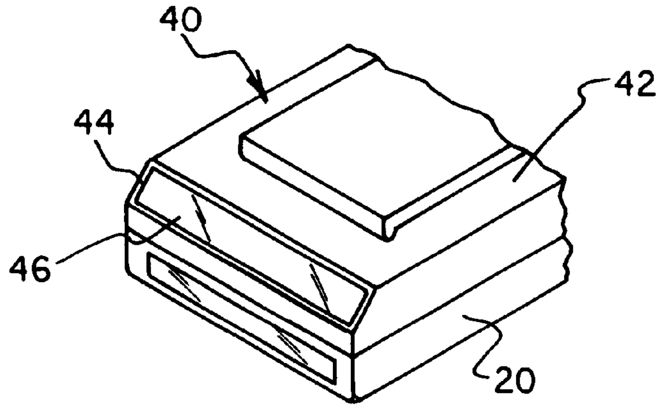
FIG. 5 is a magnified upper perspective view of the end of the illuminating means including the transparent lens.

As best illustrated in FIGS. 2 through 3, it can be shown that a clip 30 is secured to the illuminating means and extendedly projects towards the detent hinge 50. The clip 30 captures reading material for supporting the illuminating means 40. The clip 30 further maintains the page the user is reading by preventing the page from turning over. As shown in FIGS. 1 through 5 of the drawings, the illuminating means 40 has a rectangular encasement 42 secured to the detent hinge 50 and aligned along the longitudinal axis of the standard remote control 20. The rectangular encasement 42 has a slanted end 44 opposite of the detent hinge 50 as best shown in FIG. 5 of the drawings. The slanted end 44 has a transparent lens 46 as shown in FIG. 5 of the drawings thereby projecting the light downwardly towards the reading material secured by the clip 30. The illuminating means 40 has an unnumbered light within the rectangular encasement 42 near the transparent lens 46 which radiates light through the transparent lens 46 towards the reading material. As best shown in FIG. 5 of the drawings, an illumination control 48 is electronically connected to the unnumbered light and secured to the rectangular encasement 42 below the transparent lens 46 to allow the user to control the strength of illumination. An unnumbered power source is electronically connected to the illumination control 48 and secured within the rectangular encasement 42.

In use, the user positions reading material mesial the clip 30 and rectangular encasement 42. The clip 30 may engage either the top or bottom edge of the reading material. The illuminating means is rotatable, as shown in FIG. 4 of the drawings, allowing it to direct light in various selected positions. The unnumbered light radiates light through the transparent lens onto the reading surface of the reading material so the user may read in a darkened room. Alternatively, the present invention may be utilized as a flashlight when in a darkened room by pivoting the illuminating means 40 to the desired position and pointing the illuminating means 40 to illuminate the room.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illuminated remote control system comprising:

a remote control including a housing with a back and a front, a plurality of illuminated control buttons being mounted on the front of the remote control; and an illuminating means pivotally mounted on the back of the remote control in a manner such that the illuminating means pivots in a plane oriented substantially parallel to the back of the remote control.

2. The illuminated remote control system of claim 1, wherein a clip is secured to a back side of the illuminating means for securing reading material to the illuminating means.

3. The illuminated remote control system of claim 2, wherein the illuminating means comprises a rectangular encasement secured to the remote control by a detent hinge aligned along a longitudinal axis of the remote control.

4. The illuminated remote control system of claim 3, wherein the rectangular encasement comprises a slanted end opposite of the detent hinge.

5. The illuminated remote control system of claim 4, wherein the slanted end includes a transparent lens.

6. The illuminated remote control system of claim 5, wherein the illuminating means includes:

a light within the rectangular encasement near the transparent lens which radiates light through the transparent lens towards the reading material;

an illumination control electronically connected to the light and secured to the rectangular encasement below the transparent lens; and a power source electronically connected to the illumination control and secured within the rectangular encasement.

7. An illuminated remote control system comprising:

a remote control including a housing having a front and a back, and a plurality of control buttons being mounted on the front of the remote control; and an illuminating means pivotally mounted on the back of the housing, the illuminating means including an encasement pivotally mounted on the housing of the remote control such that the encasement pivots in a plane substantially parallel to the back of the housing of the remote control, the encasement having a pivot end and an illumination end.

8. The system of claim 7 wherein the encasement has a back side and front side and a perimeter, the front side of the encasement being coextensive with a portion of the back of the housing of the remote control.

9. The system of claim 7 wherein the encasement has opposite side portions of the perimeter and having a width defined between the side portions, and wherein the width of the encasement tapers narrower toward the pivot end of the encasement.

10. The system of claim 7 wherein the illuminating means includes a detent assembly mounted on the encasement for holding the encasement at a plurality of pivot positions with respect to the housing of the remote control, the detent assembly comprising a cavity formed on the encasement of the illuminating means, a detent ball being positioned in the cavity for removably positioning in an indent in the back of the housing of the remote control, a spring being mounted in the cavity and pressing the detent ball outwardly from the cavity and into the indent.

11. The system of claim 7 wherein the illuminating means includes a clip for securing reading material to the encasement adjacent to a back side of the encasement, the clip being mounted on the back on the encasement, the clip extending away from the pivot end toward the illumination end.

12. The system of claim 7 wherein the illuminating means includes a power source connected to the illumination control and positioned in the encasement.

13. The system of claim 7 wherein the illuminating means comprises a pivot mounting assembly securing the encasement to the remote control.

14. The system of claim 10 wherein the pivot mounting assembly comprises a fastener portion positioned in the encasement and a protrusion protruding from the back of the housing of the remote control, the fastener portion being threadedly mounted on the protrusion.

15. The system of claim 7 wherein the illuminating means includes a lens being mounted on the illumination end of the encasement.

16. The system of claim 15 wherein the illuminating means includes a light being mounted on the illumination end of the encasement housing, the light being located adjacent to the lens.

17. The system of claim 16 wherein the illumination end of the encasement has a slanted surface angled toward the back of the encasement; the lens forming a portion of the slanted surface for directing light from the light toward a back side of the encasement.

18. The system of claim 16 wherein the illuminating means includes an illumination control operationally connected to the light for selectively controlling the supply of power to the light.

19. An illuminated remote control system comprising:

a remote control including a housing having a front and a back, and a plurality of control buttons being mounted on the front of the remote control; and an illuminating means pivotally mounted on the back of the housing;

the illuminating means comprising:

an encasement pivotally mounted on the housing of the remote control such that the encasement pivots in a plane substantially parallel to the back of the housing of the remote control, the encasement having a pivot end and an illumination end;

wherein the illumination end has a slanted surface angled toward the back of the encasement;

wherein the encasement has a back side and front side and a perimeter, the front side of the encasement being coextensive with a portion of the back of the housing of the remote control;

wherein the encasement has opposite side portions of the perimeter and having a width defined between the side portions, wherein the width of the encasement tapers narrower toward the pivot end of the encasement;

a pivot mounting assembly securing the encasement to the remote control, the pivot mounting assembly comprising a fastener portion positioned in the encasement and a protrusion protruding from the back of the housing of the remote control, the fastener portion being threadedly mounted on the protrusion;

a detent assembly mounted on the encasement for holding the encasement at a plurality of pivot positions with respect to the housing of the remote control, the detent assembly comprising a cavity formed on the encasement of the illuminating means, a detent ball being positioned in the cavity for removably positioning in an indent in the back of the housing of the remote control, a spring being mounted in the cavity and pressing the detent ball outwardly from the cavity and into the indent;

a lens being mounted on the illumination end of the encasement, the lens forming a portion of the slanted surface, the lens being transparent;

a light being mounted on the illumination end of the encasement housing, the light being located adjacent to the lens;

a clip for securing reading material to the encasement to the encasement adjacent to a back side of the encasement, the clip being mounted on the back on the encasement, the clip extending away from the pivot end toward the illumination end;

an illumination control operationally connected to the light for selectively controlling the supply of power to the light; and a power source connected to the illumination control and positioned in the encasement.

* * * * *